United States Patent
Zhao et al.

(10) Patent No.: US 11,157,737 B2
(45) Date of Patent: Oct. 26, 2021

(54) CULTIVATED LAND RECOGNITION METHOD IN SATELLITE IMAGE AND COMPUTING DEVICE

(71) Applicant: Ping An Technology (Shenzhen) Co., Ltd., Shenzhen (CN)

(72) Inventors: Yi Zhao, Santa Clara, CA (US); Nan Qiao, Redwood City, CA (US); Ruei-Sung Lin, Redwood City, CA (US); Bo Gong, Belmont, CA (US); Mei Han, Palo Alto, CA (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 147 days.

(21) Appl. No.: 16/727,753

(22) Filed: Dec. 26, 2019

(65) Prior Publication Data

US 2021/0201023 A1 Jul. 1, 2021

(51) Int. Cl.
*G06K 9/00* (2006.01)
*G06T 7/13* (2017.01)
*G06K 9/62* (2006.01)
*G06F 17/18* (2006.01)

(52) U.S. Cl.
CPC ......... *G06K 9/00657* (2013.01); *G06F 17/18* (2013.01); *G06K 9/6215* (2013.01); *G06T 7/13* (2017.01); *G06T 2207/20084* (2013.01)

(58) Field of Classification Search
CPC .. G06F 17/18; G06K 9/6215; G06K 9/00657; G06T 7/13; G06T 2207/20084
See application file for complete search history.

(56) References Cited

PUBLICATIONS

Tan, Yihua, Shengzhou Xiong, and Yansheng Li. "Automatic extraction of built-up areas from panchromatic and multispectral remote sensing images using double-stream deep convolutional neural networks." IEEE Journal of Selected Topics in Applied Earth Observations and Remote Sensing 11.11 (2018). (Year: 2018).*
Persello C, Tolpekin VA, Bergado JR, de By RA. Delineation of agricultural fields in smallholder farms from satellite images using fully convolutional networks and combinatorial grouping. Remote sensing of environment. Sep. 15, 2019. (Year: 2019).*

(Continued)

*Primary Examiner* — Vu Le
*Assistant Examiner* — Tracy Mangialaschi
(74) *Attorney, Agent, or Firm* — ScienBiziP, P.C.

(57) ABSTRACT

A cultivated land recognition method in a satellite image includes: segmenting a satellite image of the Earth into a plurality of standard images; and recognizing cultivated land area in each of the standard images using a cultivated land recognition model to obtain a plurality of first images. Edges of ground level entities in each of the standard images are detected using an edge detection model to obtain a plurality of second images. Each of the first images and a corresponding one of the second images is merged to obtain a plurality of third images; and cultivated land images is obtained by segmenting each of the third images using a watershed segmentation algorithm. Not only can a result of recognizing cultivated land in satellite images of the Earth be improved, but an efficiency of recognizing the cultivated land also be improved. A computing device employing the method is also disclosed.

14 Claims, 2 Drawing Sheets

(56) References Cited

PUBLICATIONS

Albornoz, Enrique M., et al. "Development and evaluation of an automatic software for management zone delineation." Precision Agriculture 19.3 (2018): 463-476. (Year: 2018).*

D'Andrimont, Raphaël, Catherine Marlier, and Pierre Defourny. "Hyperspatial and multi-source water body mapping: A framework to handle heterogeneities from observations and targets over large areas." Remote Sensing 9.3 (2017): 211. (Year: 2017).*

Altaei, Mohammed Sahib, and Aqeel A. Abdul Hassan. "Novel segmentation method for fractal geometry based satellite images classification." American Scientific Research Journal for Engineering, Technology, and Sciences (ASRJETS) 28.1 (2017): 187-200. (Year: 2017).*

* cited by examiner

CULTIVATED LAND RECOGNITION METHOD IN SATELLITE IMAGE AND COMPUTING DEVICE

FIELD

The present disclosure relates to a technical field of image processing, specifically a cultivated land recognition method in a satellite image and a computing device employing the cultivated land recognition method.

BACKGROUND

Satellite technology can provide technical support for intelligent and precise agricultural applications. In the prior art, cultivated land in satellite images is mainly extracted by a method of image segmentation.

However, the image segmentation process is usually based on spectral information. The segmentation result of the image segmentation process is greatly affected by textures, wherein image characteristics of the satellite images are the mainly factors being considered.

A method and means of recognizing cultivated land in satellite images are needed.

DETAILED DESCRIPTION

The embodiments of the present disclosure are described with reference to the accompanying drawings. Described embodiments are merely embodiments which are a part of the present disclosure, and do not include every embodiment. All other embodiments obtained by those of ordinary skill in the art based on the embodiments of the present disclosure without creative efforts are within the scope of the claims.

Terms such as "first", "second" and the like in the specification and in the claims of the present disclosure and the above drawings are used to distinguish between different objects, and are not intended to describe a specific order. Moreover, terms "include" and any variations of the term "include" are intended to indicate a non-exclusive inclusion. For example, a process, a method, a system, a product, or a device which includes a series of steps or units is not limited to steps or units which are listed, but can include steps or units which are not listed, or can include other steps or units inherent to such processes, methods, products, and equipment.

Figure 1:
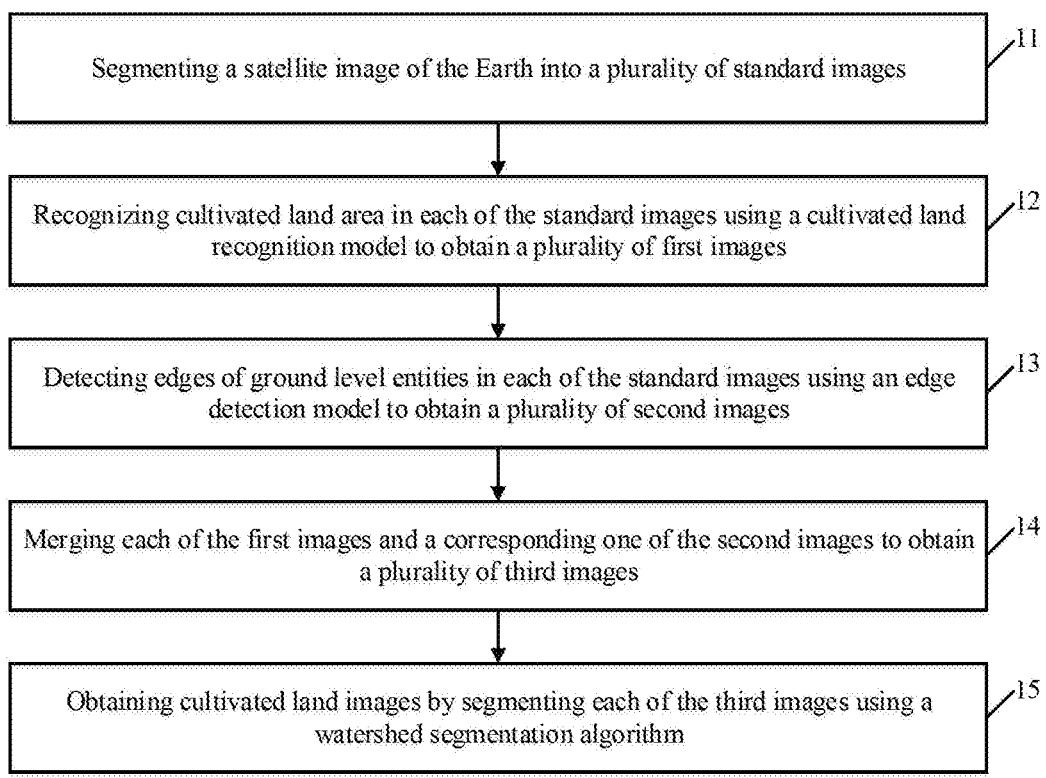
FIG. 1 shows a schematic flow chart of an embodiment of a cultivated land recognition method in a satellite image according to the present disclosure.

FIG. 1 shows a schematic flow chart of a cultivated land recognition method in a satellite image according to the present disclosure.

As shown in FIG. 1, the method applicable in a computing device can include the following steps. According to different requirements, the order of the steps in the flow may be changed, and some may be omitted. Within each step, sub-steps may be sub-numbered.

In block 11, segmenting a satellite image of the Earth into a plurality of standard images.

In some embodiments, the satellite image of the Earth can be a high-precision satellite image with sub-meter and multi-band resolution, which refers to an image of land collected by satellite. In the satellite image of the Earth, the Earth includes cultivated land and non-cultivated land. Cultivated land shows strong spectral/textural similarities and has distinct natural edges, which provides a possibility of recognizing cultivated land in the satellite image of the Earth.

The standard image refers to an image that can be used as an input parameter to a neural network by segmenting the satellite image of the Earth.

In some embodiments, the satellite image of the Earth can be segmented into a plurality of standard images by scanning. For example, if the satellite image of the Earth is 300,000*300,000, and the standard image is 512*512, a horizontal scanning and a vertical scanning are performed from a pixel in a 1st row and 1st column of the satellite image of the Earth, and every 512th pixel point scanned is used as a dividing point. Ending the horizontal scanning when scanning to a 1st row and last column in the satellite image of the Earth, and ending the vertical scanning when scanning to a last row and 1st column in the satellite image of the Earth. Then, a horizontal straight line and a vertical straight line where each the dividing point is located are used as a dividing line, and the satellite image of the Earth is segmented according to the dividing lines to obtain a plurality of 512*512 standard images.

In some embodiments, the method further includes: enhancing the satellite image of the Earth before segmenting the satellite image of the Earth into a plurality of standard images, or enhancing each of plurality of standard images after segmenting the satellite image of the Earth into a plurality of standard images.

In some embodiments, the enhancing can include a combination of one or more of the following: a grayscale histogram, a gamma transformation, a histogram normalization, and a linear transformation.

In the above embodiments, enhancing the satellite image of the Earth or each of the standard images promotes discrimination between the cultivated land and the non-cultivated land in the satellite image of the Earth, thereby improving a recognition accuracy of the cultivated land.

In block 12, recognizing cultivated land area in each of the standard images using a cultivated land recognition model to obtain a plurality of first images.

In some embodiments, one standard image is input to the cultivated land recognition model for recognition, and the cultivated land recognition model correspondingly outputs one first image. The first image includes identifiers of the cultivated land and the non-cultivated land. Pixels in the first image include two pixel values: 0 and 1. When a value of a pixel is 1, it means that the pixel represents the cultivated land. When a value of a pixel is 0, it means that the pixel represents non-cultivated land. Thus, the first image is a binarized image, the value of the pixels belonging to the cultivated land is 1, and the value of the pixels belonging to the non-cultivated land is 0.

In some embodiments, the method further includes: training the cultivated land recognition model. That is, the cultivated land recognition model is a pre-trained deep learning model based on a deep convolution learning network or other neural network models.

In some embodiments, a training process of the cultivated land recognition model includes:

121) acquiring a plurality of positive sample images and a plurality of negative sample images, wherein each of the positive sample images is a cultivated land image, and each of the negative sample images is a non-cultivated land image;

122) inputting the plurality of positive sample images and the plurality of negative sample images into a deep convolutional network for training;

123) calculating a risk loss value of a risk loss function of the deep convolutional network;

124) determining whether the risk loss value matches a preset convergence condition;

125) when the risk loss value is determined to match the preset convergence condition, updating parameters of an initial network framework of the deep convolutional network according to the risk loss value; and 126) determining the initial network framework after updating the parameters as a trained cultivated land recognition model.

In the above embodiments, a plurality of positive sample images and a plurality of negative sample images may be collected in advance, and then each of the collected images is resampled according to a predetermined sampling frequency. A size of each of the collected sample images is unified to a predetermined size, for example, 512*512. By re-sampling the positive sample images and the negative sample images to the same size, a convergence speed of the deep convolution learning network can be accelerated, thereby improving an efficiency of training the cultivated land recognition model.

In some embodiments, an initial network framework of the deep convolution learning network includes: a backbone network layer, a pooling layer, and a loss layer. The backbone network layer adopts an Xception network. The loss layer adopts a Cross Entropy (CE) loss function or an Aggregated Cross Entropy (ACE) loss function. Parameters in the initial network framework include step sizes, weights, and the like.

In the above embodiments, by inputting the plurality of positive sample images and the plurality of negative sample images into the initial network framework of the deep convolution learning network, a risk loss value is calculated. The parameters in the initial network framework are updated using a back propagation algorithm, and the training process of the deep convolution learning network is ended when the calculated risk loss value matches a convergence condition. At this time, the parameters in the initial network framework are optimal parameters, and the cultivated land recognition model corresponding to the optimal parameters is an optimal model. The trained cultivated land recognition model can combine spectral, textural, and semantic information of the satellite image of the Earth to identify the cultivated land and the non-cultivated land.

In block 13, detecting edges of ground level entities in each of the standard images using an edge detection model to obtain a plurality of second images.

Each of the standard images is used as an input of the edge detection model. Edge detection is performed when the edge detection model receives an standard image, and then an edge image and an edge intensity value of each pixel in the standard image are output. The edge image is the second image. The edge intensity value is a probability that a pixel point belongs to the edge. The larger the edge intensity value, the greater is the probability that the corresponding pixel point belongs to the edge. The smaller the edge intensity value, the smaller is the probability that the corresponding pixel point belongs to the edge.

In some embodiments, the method of detecting edges of ground level entities in the standard image using an edge detection model to obtain a second image includes:

131) inputting the standard image into a first edge detection model to detect, the first edge detection model including a plurality of convolutional layers;

132) acquiring feature map output by each convolutional layer of the plurality of convolutional layers;

133) up-sampling a size of each the feature map to a size of the standard image to obtain up-sampled images;

134) detecting each of the up-sampled images using a second edge detection model to obtain a probability that each pixel in the up-sampled image belongs to the edge;

135) calculating an average probability of each pixel at the same position in all the up-sampled images; and 136) generating a second image according to the average probability of each pixel.

In some embodiments, the first edge detection model and the second edge detection model are a pre-trained deep learning model based on a VGGNET network. The edge detection model based on the VGGNET network is prior art, and will not be elaborated.

The edge detection model includes a plurality of convolution layers. After inputting the standard image into the first edge detection model, each of the convolution layers in the first edge detection model outputs a feature map, and a size of a feature map output by a previous convolution layer is twice a size of a feature map output by a next convolution layer.

Exemplarily, it is assumed that the first edge detection model includes five convolution layers: a first convolution layer, a second convolution layer, a third convolution layer, a fourth convolution layer, and a fifth convolution layer. The first convolution layer outputs a first feature map, the second convolution layer outputs a second feature map, the third convolution layer outputs a third feature map, the fourth convolution layer outputs a fourth feature map, and the fifth convolution layer outputs a fifth feature map. The first feature map can be detected by using the second edge detection model to obtain a first probability of each pixel in the first feature map belonging to the edge. The second feature map is up-sampled to a same size as the first feature map, and then the detection applied to up-sampled second feature map by using the second edge detection model to obtain a second probability of each pixel in the second feature map belonging to the edge. The third feature map is up-sampled to a same size as the first feature map, and then the up-sampled third feature map can be detected by using the second edge detection model to obtain a third probability of each pixel in the third feature map belonging to the edge. The fourth feature map is up-sampled to a same size as the first feature map, and then the up-sampled fourth feature map can be detected by using the second edge detection model to obtain a fourth probability of each pixel in the fourth feature map belonging to the edge. The fifth feature map is up-sampled to a same size as the first feature map, and then the up-sampled fifth feature map can be detected by using the second edge detection model to obtain a fifth probability of each pixel in the fifth feature map belonging to the edge. The average probability of each pixel belonging to the edge can be calculated by combining the first to fifth probabilities.

In the above embodiment, by up-sampling the size of the feature maps output by different convolutional layers, and detecting the up-sampled feature maps by the second edge detection model to obtain the probability that each pixel point in each of the feature maps belongs to the edge, a sensitivity of the edge detection to different resolutions of the satellite image of the Earth can be reduced. Not only is an accuracy of edge detection improved, but detail features in the satellite image of the Earth can also be preserved, and the obtained edge detection result is more complete.

In block 14, merging each of the first images and a corresponding one of the second images to obtain a plurality of third images.

In the above embodiment, the first image displays the cultivated land and the non-cultivated land, and the second image corresponding to the first image displays edge of the cultivated land and edge of the non-cultivated. After merging the first image and the corresponding second image, the corresponding third image can be obtained. The third image is used to display ridges in the satellite image of the Earth.

In some embodiments, the method of merging the first image and the corresponding second image to obtain a third image includes:

141) acquiring candidate pixel points in the second image, wherein the candidate pixel points are pixel points having probabilities greater than or equal to a preset probability threshold;

142) acquiring target pixel points in the first image that have same positions as the candidate pixel points;

143) determining ridge areas corresponding to the target pixel points in the first image; and 144) obtaining the third image by displaying the ridge areas in a first display mode, and displaying other areas in a second display mode.

The pixel points of the first image have a one-to-one correspondence with the pixel points in the second image, and the one-to-one correspondence may be determined by position coordinates. Two pixel points having the same positional coordinates are corresponding, and two pixel points not having the same positional coordinate do not correspond. For example, for a pixel point A in a 5th row and 10th line in the first image, the position coordinate of the pixel point A is (5, 10), and the position coordinates of the pixel point corresponding to the pixel point A in the second image are (5, 10). That is, a pixel B in a 10th row and 10th line in the second image corresponds to the pixel point A.

In the above embodiment, an actual edge can be obtained by acquiring candidate pixel points in the second image which have a probability greater than or equal to a preset probability threshold.

In block 15, obtaining cultivated land images by segmenting each of the third images using a watershed segmentation algorithm.

In the above embodiment, the watershed segmentation algorithm is used to segment each of the third images to obtain accurate cultivated land. The watershed segmentation algorithm is a mathematical morphology segmentation method based on topological theory. The watershed segmentation algorithm is prior art and not elaborated herein.

In some embodiments, a marker-based improved watershed segmentation algorithm is used to segment each of the third images, to achieve a better segmentation effect.

In some embodiments, after obtaining the cultivated land images by segmenting each of the third images using a watershed segmentation algorithm, the method further includes:

151) performing corrosion and expansion treatment on each of the cultivated land images;

152) calculating a quantity of pixels in each of connected areas in the performed cultivated land images;

153) determining connected areas which have a quantity of the pixels less than or equal to a preset quantity threshold as first areas, and connected areas which have a quantity of the pixels more than the preset quantity threshold as second areas;

154) setting pixels in the first areas to 0 and pixels in the second areas to 1 to obtain a plurality of binarized images; and 155) converting each of the plurality of binarized images into a vector image and storing the vector image.

In the above embodiment, the preset quantity threshold is a threshold value set in advance. The preset quantity threshold can be 5 or other value. The preset quantity threshold may be adjusted or modified according to actual conditions.

Since there is a small amount of noise in the image of cultivated land obtained by segmenting the third image by the watershed segmentation algorithm, it is necessary to perform post-morphological processing after obtaining the cultivated land. The processed of third image includes a plurality of connected regions. If a quantity of the pixels in a connected region is less than the preset quantity threshold, it indicates that the connected region contains more noise. If a quantity of the pixels in a connected region is not less than the preset quantity threshold, it indicates that the connected region has little or no noise. Moreover, by converting each of the binarized image into a vector image, storage space is saved.

In some embodiments, the method of converting the binarized image into a vector image includes:

154a) determining a plurality of curves in the binarized image;

154b) acquiring target coordinates of a first point and a last point of each curve;

154c) connecting a straight line between the first point and the last point;

154d) calculating Euclidean distances between a plurality of points on the curve and the straight line;

154e) selecting a maximum Euclidean distance from the Euclidean distances;

154f) determining whether the maximum Euclidean distance is greater than or equal to a preset threshold;

154g) when the maximum Euclidean distance is greater than or equal to the preset threshold, dividing the curve into two parts at a point corresponding to the maximum Euclidean distance;

154h) iteratively performing above steps until all the curves are converted to straight lines;

154i) generating a vector image according to the straight lines.

In the above embodiment, in a process of converting each of the binarized image into a vector image, some jagged boundaries are created, so the jagged boundaries need to be smoothed.

Taking a curve Q in the binarized image as an example, the curve Q has a first coordinate point A1, an intermediate coordinate point A2, an intermediate coordinate point A3 and a tail coordinate point A4. A straight line L1 is created according to the first coordinate point A1 and the tail coordinate point A4. A Euclidean distance D1 between the intermediate coordinate point A2 and the straight line L1 is calculated, and a Euclidean distance D2 between the intermediate coordinate point A3 and the straight line L1 is calculated.

In a first embodiment, when the Euclidean distance D1 is greater than or equal to the Euclidean distance D2, the Euclidean distance D1 is determined to be the maximum distance value. And when the Euclidean distance D1 is greater than the preset threshold D0, the curve Q is divided into a first curve Q1 and a second curve Q2 by using the intermediate coordinate point A2 corresponding to the Euclidean distance D1 as a dividing point. The first curve Q1 includes the coordinate points A1 and A2, and the second curve Q2 includes the coordinate points A2, A3 and A4.

In a second embodiment, when the Euclidean distance D1 is greater than or equal to the Euclidean distance D2, the Euclidean distance D1 is determined to be the maximum distance value, but when the Euclidean distance D1 is not greater than the preset threshold D0, the curve Q is replaced with the straight line L1.

In a third embodiment, when the Euclidean distance D2 is greater than or equal to the Euclidean distance D1, the Euclidean distance D2 is determined to be the maximum distance value. And when the Euclidean distance D2 is greater than the preset threshold D0, the curve Q is divided into a third curve Q3 and a fourth curve Q4 by using the intermediate coordinate point A3 corresponding to the Euclidean distance D2 as a dividing point. The third curve Q3 includes the coordinate points A1, A2 and A3, and the fourth curve Q4 includes the coordinate points A3 and A4.

In a fourth embodiment, when the Euclidean distance D2 is greater than or equal to the Euclidean distance D2, the Euclidean distance D2 is determined to be the maximum distance value, but when the Euclidean distance D2 is not greater than the preset threshold D0, the curve Q is replaced with the straight line L1.

The present disclosure provides the method of segmenting a satellite image of the Earth into a plurality of standard images; and recognizing cultivated land area in each of the standard images using a cultivated land recognition model to obtain a plurality of first images. Edges of ground level entities in each of the standard images are detected using an edge detection model to obtain a plurality of second images. Each of the first images and a corresponding one of the second images is merged to obtain a plurality of third images; and cultivated land images is obtained by segmenting each of the third images using a watershed segmentation algorithm. Not only can a result of recognizing cultivated land in satellite images of the Earth be improved, but an efficiency of recognizing the cultivated land also be improved.

Figure 2:
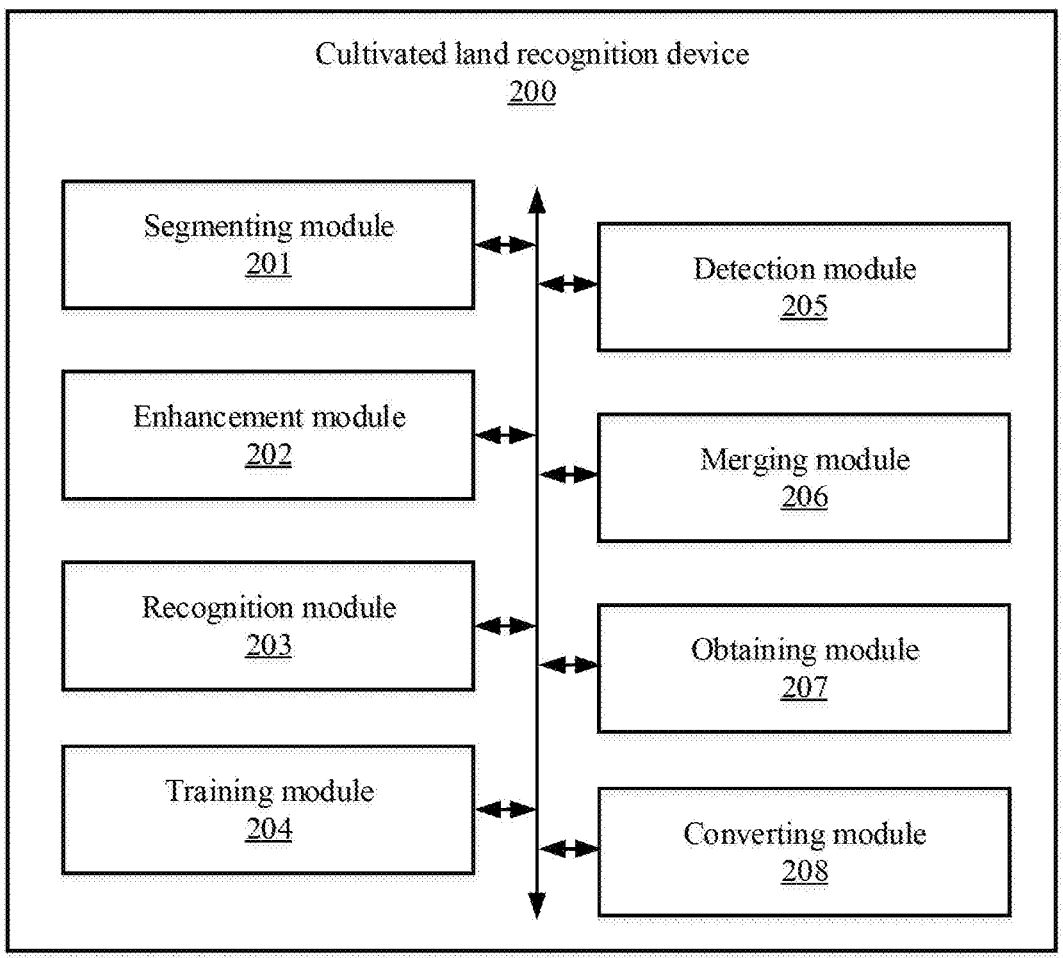
FIG. 2 shows a schematic structural diagram of an embodiment of a cultivated land device in a satellite image according to the present disclosure.

FIG. 2 shows a schematic structural diagram of an embodiment of a cultivated land device in a satellite image (cultivated land recognition device 200) according to the present disclosure.

In some embodiments, the cultivated land recognition device 200 can include a plurality of function modules consisting of program code segments. The program code of each program code segments in the image generation device based on the cultivated land recognition device 200 may be stored in a memory of a computing device and executed by the at least one processor to recognize cultivated land in satellite images of the Earth (described in detail in FIG. 1).

In an embodiment, the cultivated land recognition device 200 can be divided into a plurality of functional modules, according to the performed functions. The functional modules can include: a segmenting module 201, an enhancement module 202, a recognition module 203, a training module 204, a detection module 205, a merging module 206, a obtaining module 207, and a converting module 208. A module as referred to in the present disclosure refers to a series of computer program segments that can be executed by at least one processor and that are capable of performing fixed functions, which are stored in a memory. In this embodiment, the functions of each module will be detailed in the following embodiments.

The segmenting module 201 is configured to segment a satellite image of the Earth into a plurality of standard images.

In some embodiments, the satellite image of the Earth can be a high-precision satellite image with sub-meter and multi-band resolution, which refers to an image of land collected by satellite. In the satellite image of the Earth, the Earth includes cultivated land and non-cultivated land. Cultivated land shows strong spectral/textural similarities and has distinct natural edges, which provides a possibility of recognizing cultivated land in the satellite image of the Earth.

The standard image refers to an image that can be used as an input parameter to a neural network by segmenting the satellite image of the Earth.

In some embodiments, the satellite image of the Earth can be segmented into a plurality of standard images by scanning. For example, if the satellite image of the Earth is 300,000*300,000, and the standard image is 512*512, a horizontal scanning and a vertical scanning are performed from a pixel in a 1st row and 1st column of the satellite image of the Earth, and every 512th pixel point scanned is used as a dividing point. Ending the horizontal scanning when scanning to a 1st row and last column in the satellite image of the Earth, and ending the vertical scanning when scanning to a last row and 1st column in the satellite image of the Earth. Then, a horizontal straight line and a vertical straight line where each the dividing point is located are used as a dividing line, and the satellite image of the Earth is segmented according to the dividing lines to obtain a plurality of 512*512 standard images.

The enhancement module 202 is configured to enhance the satellite image of the Earth before segmenting the satellite image of the Earth into a plurality of standard images, or to enhance each of plurality of standard images after segmenting the satellite image of the Earth into a plurality of standard images.

In some embodiments, the enhancing can include a combination of one or more of the following: a grayscale histogram, a gamma transformation, a histogram normalization, and a linear transformation.

In the above embodiments, enhancing the satellite image of the Earth or each of the standard images promotes discrimination between the cultivated land and the non-cultivated land in the satellite image of the Earth, thereby improving a recognition accuracy of the cultivated land.

The recognition module 203 is configured to recognize cultivated land area in each of the standard images using a cultivated land recognition model to obtain a plurality of first images.

In some embodiments, one standard image is input to the cultivated land recognition model for recognition, and the cultivated land recognition model correspondingly outputs one first image. The first image includes identifiers of the cultivated land and the non-cultivated land. Pixels in the first image include two pixel values: 0 and 1. When a value of a pixel is 1, it means that the pixel represents the cultivated land. When a value of a pixel is 0, it means that the pixel represents non-cultivated land. Thus, the first image is a binarized image, the value of the pixels belonging to the cultivated land is 1, and the value of the pixels belonging to the non-cultivated land is 0.

The training module 204 is configured to train the cultivated land recognition model. That is, the cultivated land recognition model is a pre-trained deep learning model based on a deep convolution learning network or other neural network models.

In some embodiments, the training module 204 training the cultivated land recognition model includes:

121) acquiring a plurality of positive sample images and a plurality of negative sample images, wherein each of the positive sample images is a cultivated land image, and each of the negative sample images is a non-cultivated land image;

122) inputting the plurality of positive sample images and the plurality of negative sample images into a deep convolutional network for training;

123) calculating a risk loss value of a risk loss function of the deep convolutional network;

124) determining whether the risk loss value matches a preset convergence condition;

125) when the risk loss value is determined to match the preset convergence condition, updating parameters of an initial network framework of the deep convolutional network according to the risk loss value; and 126) determining the initial network framework after updating the parameters as a trained cultivated land recognition model.

In the above embodiments, a plurality of positive sample images and a plurality of negative sample images may be collected in advance, and then each of the collected images is resampled according to a predetermined sampling frequency. A size of each of the collected sample images is unified to a predetermined size, for example, 512*512. By re-sampling the positive sample images and the negative sample images to the same size, a convergence speed of the deep convolution learning network can be accelerated, thereby improving an efficiency of training the cultivated land recognition model.

In some embodiments, an initial network framework of the deep convolution learning network includes: a backbone network layer, a pooling layer, and a loss layer. The backbone network layer adopts an Xception network. The loss layer adopts a Cross Entropy (CE) loss function or an Aggregated Cross Entropy (ACE) loss function. Parameters in the initial network framework include step sizes, weights, and the like.

In the above embodiments, by inputting the plurality of positive sample images and the plurality of negative sample images into the initial network framework of the deep convolution learning network, a risk loss value is calculated. The parameters in the initial network framework are updated using a back propagation algorithm, and the training process of the deep convolution learning network is ended when the calculated risk loss value matches a convergence condition. At this time, the parameters in the initial network framework are optimal parameters, and the cultivated land recognition model corresponding to the optimal parameters is an optimal model. The trained cultivated land recognition model can combine spectral, textural, and semantic information of the satellite image of the Earth to identify the cultivated land and the non-cultivated land.

The detection module 205 is configured to detect edges of ground level entities in each of the standard images using an edge detection model to obtain a plurality of second images.

Each of the standard images is used as an input of the edge detection model. Edge detection is performed when the edge detection model receives an standard image, and then an edge image and an edge intensity value of each pixel in the standard image are output. The edge image is the second image. The edge intensity value is a probability that a pixel point belongs to the edge. The larger the edge intensity value, the greater is the probability that the corresponding pixel point belongs to the edge. The smaller the edge intensity value, the smaller is the probability that the corresponding pixel point belongs to the edge.

In some embodiments, the detection module 205 detecting edges of ground level entities in the standard image using an edge detection model to obtain a second image includes:

131) inputting the standard image into a first edge detection model to detect, the first edge detection model including a plurality of convolutional layers;

132) acquiring feature map output by each convolutional layer of the plurality of convolutional layers;

133) up-sampling a size of each the feature map to a size of the standard image to obtain up-sampled images;

134) detecting each of the up-sampled images using a second edge detection model to obtain a probability that each pixel in the up-sampled image belongs to the edge;

135) calculating an average probability of each pixel at the same position in all the up-sampled images; and 136) generating a second image according to the average probability of each pixel.

In some embodiments, the first edge detection model and the second edge detection model are a pre-trained deep learning model based on a VGGNET network. The edge detection model based on the VGGNET network is prior art, and will not be elaborated.

The edge detection model includes a plurality of convolution layers. After inputting the standard image into the first edge detection model, each of the first convolution layers in the edge detection model outputs a feature map, and a size of a feature map output by a previous convolution layer is twice a size of a feature map output by a next convolution layer.

Exemplarily, it is assumed that the first edge detection model includes five convolution layers: a first convolution layer, a second convolution layer, a third convolution layer, a fourth convolution layer, and a fifth convolution layer. The first convolution layer outputs a first feature map, the second convolution layer outputs a second feature map, the third convolution layer outputs a third feature map, the fourth convolution layer outputs a fourth feature map, and the fifth convolution layer outputs a fifth feature map. The first feature map can be detected by using the second edge detection model to obtain a first probability of each pixel in the first feature map belonging to the edge. The second feature map is up-sampled to a same size as the first feature map, and then detection applied to the up-sampled second feature map by using the second edge detection model to obtain a second probability of each pixel in the second feature map belonging to the edge. The third feature map is up-sampled to a same size as the first feature map, and then the up-sampled third feature map can be detected by using the second edge detection model to obtain a third probability of each pixel in the third feature map belonging to the edge. The fourth feature map is up-sampled to a same size as the first feature map, and then the up-sampled fourth feature map can be detected by using the second edge detection model to obtain a fourth probability of each pixel in the fourth feature map belonging to the edge. The fifth feature map is up-sampled to a same size as the first feature map, and then the up-sampled fifth feature map can be detected by using the second edge detection model to obtain a fifth probability of each pixel in the fifth feature map belonging to the edge. The average probability of each pixel belonging to the edge can be calculated by combining the first to fifth probabilities.

In the above embodiment, by up-sampling the size of the feature maps output by different convolutional layers, and detecting the up-sampled feature maps by the second edge detection model to obtain the probability that each pixel point in each of the feature maps belongs to the edge, a sensitivity of the edge detection to different resolutions of the satellite image of the Earth can be reduced. Not only is an accuracy of edge detection be improved, but detail features in the satellite image of the Earth can also be preserved, and the obtained edge detection result is more complete.

The merging module 206 is configured to merge each of the first images and a corresponding one of the second images to obtain a plurality of third images.

In the above embodiment, the first image displays the cultivated land and the non-cultivated land, and the second image corresponding to the first image displays edge of the cultivated land and edge of the non-cultivated. After merging the first image and the corresponding second image, the corresponding third image can be obtained. The third image is used to display ridges in the satellite image of the Earth.

In some embodiments, the merging module 206 merging the first image and the corresponding second image to obtain a third image includes:

141) acquiring candidate pixel points in the second image, wherein the candidate pixel points are pixel points having probabilities greater than or equal to a preset probability threshold;

142) acquiring target pixel points in the first image that have same positions as the candidate pixel points;

143) determining ridge areas corresponding to the target pixel points in the first image; and 144) obtaining the third image by displaying the ridge areas in a first display mode, and displaying other areas in a second display mode.

The pixel points of the first image have a one-to-one correspondence with the pixel points in the second image, and the one-to-one correspondence may be determined by position coordinates. Two pixel points having the same positional coordinates are corresponding, and two pixel points not having the same positional coordinate do not correspond. For example, for a pixel point A in a 5th row and 10th line in the first image, the position coordinate of the pixel point A is (5, 10), and the position coordinates of the pixel point corresponding to the pixel point A in the second image are (5, 10). That is, a pixel B in a 10th row and 10th line in the second image corresponds to the pixel point A.

In the above embodiment, an actual edge can be obtained by acquiring candidate pixel points in the second image which have a probability is greater than or equal to a preset probability threshold.

The obtaining module 207 is configured to obtain cultivated land images by segmenting each of the third images using a watershed segmentation algorithm.

In the above embodiment, the watershed segmentation algorithm is used to segment each of the third images to obtain accurate cultivated land. The watershed segmentation algorithm is a mathematical morphology segmentation method based on topological theory. The watershed segmentation algorithm is prior art and not elaborated herein.

In some embodiments, a marker-based improved watershed segmentation algorithm is used to segment each of the third images, to achieve a better segmentation effect.

In some embodiments, after obtaining the cultivated land images by segmenting each of the third images using a watershed segmentation algorithm, the cultivated land recognition device 200 further includes: a converting module 208, is configured to convert each of the cultivated land images into a vector image and storing the vector image.

In some embodiments, the converting module 208 converting each of the cultivated land images into a vector image and storing the vector image includes:

151) performing corrosion and expansion treatment on each of the cultivated land images;

152) calculating a quantity of pixels in each of connected areas in the performed cultivated land images;

153) determining connected areas which have a quantity of the pixels less than or equal to a preset quantity threshold as first areas, and connected areas which have a quantity of the pixels more than the preset quantity threshold as second areas;

154) setting pixels in the first areas to 0 and pixels in the second areas to 1 to obtain a plurality of binarized images; and 155) converting each of the plurality of binarized images into a vector image and storing the vector image.

In the above embodiment, the preset quantity threshold is a threshold value set in advance. The preset quantity threshold can be 5 or other value. The preset quantity threshold may be adjusted or modified according to actual conditions.

Since there is a small amount of noise in the image of cultivated land obtained by segmenting the third image by the watershed segmentation algorithm, it is necessary to perform post-morphological processing after obtaining the cultivated land. The processed of third image includes a plurality of connected regions. If a quantity of the pixels in a connected region is less than the preset quantity threshold, it indicates that the connected region contains more noise. If a quantity of the pixels in a connected region is not less than the preset quantity threshold, it indicates that the connected region has little or no noise. Moreover, by converting each of the binarized image into a vector image, storage space is saved.

In some embodiments, the method of converting the binarized image into a vector image includes:

154a) determining a plurality of curves in the binarized image;

154b) acquiring target coordinates of a first point and a last point of each curve;

154c) connecting a straight line between the first point and the last point;

154d) calculating Euclidean distances between a plurality of points on the curve and the straight line;

154e) selecting a maximum Euclidean distance from the Euclidean distances;

154f) determining whether the maximum Euclidean distance is greater than or equal to a preset threshold;

154g) when the maximum Euclidean distance is greater than or equal to the preset threshold, dividing the curve into two parts at a point corresponding to the maximum Euclidean distance;

154h) iteratively performing above steps until all the curves are converted to straight lines;

154i) generating a vector image according to the straight lines.

In the above embodiment, in a process of converting each of the binarized image into a vector image, some jagged boundaries are created, so the jagged boundaries need to be smoothed.

Taking a curve Q in the binarized image as an example, the curve Q has a first coordinate point A1, an intermediate coordinate point A2, an intermediate coordinate point A3 and a tail coordinate point A4. A straight line L1 is created according to the first coordinate point A1 and the tail coordinate point A4. A Euclidean distance D1 between the intermediate coordinate point A2 and the straight line L1 is calculated, and a Euclidean distance D2 between the intermediate coordinate point A3 and the straight line L1 is calculated.

In a first embodiment, when the Euclidean distance D1 is greater than or equal to the Euclidean distance D2, the Euclidean distance D1 is determined to be the maximum distance value. And when the Euclidean distance D1 is greater than the preset threshold D0, the curve Q is divided into a first curve Q1 and a second curve Q2 by using the intermediate coordinate point A2 corresponding to the Euclidean distance D1 as a dividing point. The first curve Q1 includes the coordinate points A1 and A2, and the second curve Q2 includes the coordinate points A2, A3, and A4.

In a second embodiment, when the Euclidean distance D1 is greater than or equal to the Euclidean distance D2, the Euclidean distance D1 is determined to be the maximum distance value, but when the Euclidean distance D1 is not greater than the preset threshold D0, the curve Q is replaced with the straight line L1.

In a third embodiment, when the Euclidean distance D2 is greater than or equal to the Euclidean distance D1, the Euclidean distance D2 is determined to be the maximum distance value. And when the Euclidean distance D2 is greater than the preset threshold D0, the curve Q is divided into a third curve Q3 and a fourth curve Q4 by using the intermediate coordinate point A3 corresponding to the Euclidean distance D2 as a dividing point. The third curve Q3 includes the coordinate points A1, A2, and A3, and the fourth curve Q4 includes the coordinate points A3 and A4.

In a fourth embodiment, when the Euclidean distance D2 is greater than or equal to the Euclidean distance D2, the Euclidean distance D2 is determined to be the maximum distance value, but when the Euclidean distance D2 is not greater than the preset threshold D0, the curve Q is replaced with the straight line L1.

The present disclosure provides the device of segmenting a satellite image of the Earth into a plurality of standard images; and recognizing cultivated land area in each of the standard images using a cultivated land recognition model to obtain a plurality of first images. Edges of ground level entities in each of the standard images are detected using an edge detection model to obtain a plurality of second images. Each of the first images and a corresponding one of the second images is merged to obtain a plurality of third images; and cultivated land images is obtained by segmenting each of the third images using a watershed segmentation algorithm. Not only can a result of recognizing cultivated land in satellite images of the Earth be improved, but an efficiency of recognizing the cultivated land also be improved.

Figure 3:
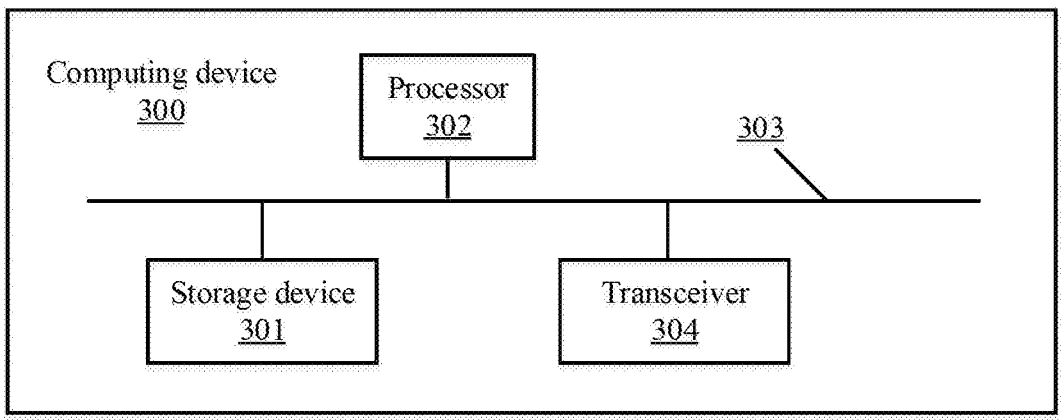
FIG. 3 shows a schematic structural diagram of a computing device employing the cultivated land recognition method according to the present disclosure.

FIG. 3 shows a schematic structural diagram of a computing device (computing device 300) according to an embodiment of the present disclosure.

As shown in FIG. 3, the computing device 300 may include: at least one storage device 301, at least one processor 302, at least one communication bus 303, and a transceiver 304.

It should be understood by those skilled in the art that the structure of the computing device 300 shown in FIG. 3 does not constitute a limitation of the embodiment of the present disclosure. The computing device 300 may be a bus type structure or a star type structure, and other examples of the computing device 300 may also include more or less hardware or software than illustrated, or may have different component arrangements.

In at least one embodiment, the computing device 300 can include a terminal that is capable of automatically performing numerical calculations and/or information processing in accordance with pre-set or stored instructions. The hardware of the terminal can include, but is not limited to, a microprocessor, an application specific integrated circuit, programmable gate arrays, digital processors, and embedded devices. The computing device 300 may further include an electronic device. The electronic device can interact with a user through a keyboard, a mouse, a remote controller, a touch panel or a voice control device, it can be for example an individual computer, a tablet, a smartphone, or a digital camera, etc.

It should be noted that the computing device 300 is merely an example, in other examples, existing or future electronic products may be included and thus within the scope of the present disclosure, and are included in the reference.

In some embodiments, the storage device 301 can be used to store program codes of computer readable programs and various image, such as the cultivated land recognition device 200 installed in the computing device 300, and allow automatic access to the programs. The storage device 301 can include a read-only memory (ROM), a programmable read-only memory (PROM), an erasable programmable read only memory (EPROM), an one-time programmable read-only memory (OTPROM), an electronically-erasable programmable read-only memory (EEPROM), a compact disc read-only memory (CD-ROM), or other optical disk storage, magnetic disk storage, magnetic tape storage, or any other non-transitory storage medium readable by the computing device 300 that can be used to carry or store image.

In some embodiments, the at least one processor 302 may be composed of an integrated circuit, for example, may be composed of a single packaged integrated circuit, or may be composed of multiple integrated circuits of same function or different functions. The at least one processor 302 can include one or more central processing units (CPU), a microprocessor, a digital processing chip, a graphics processor, and various control chips. The at least one processor 302 is a control unit of the computing device 300, which connects various components computing device using various interfaces and lines. By running or executing a computer program or modules stored in the storage device 301, and by invoking the image stored in the storage device 301, the at least one processor 302 can perform various functions.

In some embodiments, the least one bus 303 is used to achieve communication between the storage device 301 and the at least one processor 302, and other components of the computing device 300.

Although it is not shown, the computing device 300 may further include a power supply (such as a battery) for powering various components. Preferably, the power supply may be logically connected to the at least one processor 302 through a power management device, thereby, the power management device manages functions such as charging, discharging, and power management. The power supply may include DC or AC power source or both, a recharging device, a power failure detection circuit, a power converter or inverter, a power status indicator, and the like. The computing device 300 may further include various sensors, such as a BLUETOOTH module, a WI-FI module, and the like, and details are not described herein.

It should be understood that the described embodiments are for illustrative purposes only and are not limited in the scope of the present disclosure.

The above-described integrated unit implemented in form of software function modules can be stored in a computer readable storage medium. The above software function modules are stored in a storage medium, and include a plurality of instructions for causing a computing device (which may be a personal computer, or a network device, etc.) or a processor to execute the method according to various embodiments of the present disclosure.

In a further embodiment, in conjunction with FIG. 2, the at least one processor 302 can execute an operating system and various types of applications (such as the cultivated land recognition device 200) installed in the computing device 300, program codes, and the like. For example, the at least one processor 302 can execute the modules 201-208.

In at least one embodiment, the storage device 301 stores program codes. The at least one processor 302 can invoke the program codes stored in the storage device 301 to perform related functions. For example, the modules described in FIG. 2 are program codes stored in the storage device 301 and executed by the at least one processor 302, to implement the functions of the various modules.

In at least one embodiment, the storage device 301 stores a plurality of instructions that are executed by the at least one processor 302 to implement all or part of the steps of the method described in the embodiments of the present disclosure.

The embodiments of the present disclosure further provide a non-transitory storage medium, and the A non-transitory storage medium stores a program that performs all or part of the steps including any of the method described in the above embodiments.

It should be noted that, for simplicity in description, the above method embodiments are expressed as a series of action combinations, but those skilled in the art should understand that the present disclosure is not limited by the described action sequences. According to the present disclosure, some steps in the above embodiments can be performed in other sequences or simultaneously. Secondly, those skilled in the art should also understand that the embodiments described in the specification are all optional embodiments, and that all the actions and units involved are not necessarily required by the present disclosure.

In the above embodiments, descriptions of each embodiment have different focuses, and when there is no detail part in a certain embodiment, other embodiments will provide clarification.

In several embodiments provided in the preset application, it should be understood that the disclosed apparatus can be implemented in other ways. For example, the device embodiments described above are merely illustrative. For example, divisions of the units are only a logical function division, and there can be other manners of division in actual implementation.

The modules described as separate components may or may not be physically separated, and the components displayed as modules may or may not be physical units. That is, it can be located in one place, or distributed to multiple network units. Some or all of the modules can be selected according to actual needs to achieve the purpose of the solution of above embodiments.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

The above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and these modifications or substitutions are not to detract from the essence of the corresponding technical solutions or from the scope of the technical solutions of the embodiments of the present disclosure.

We claim:

1. A cultivated land recognition method in a satellite image applicable in a computing device, the cultivated land recognition method comprising:
   segmenting a satellite image of the Earth into a plurality of standard images;
   recognizing cultivated land area in each of the standard images using a cultivated land recognition model to obtain a plurality of first images;
   detecting edges of ground level entities in each of the standard images using an edge detection model to obtain a plurality of second images;
   merging each of the first images and a corresponding one of the second images to obtain a plurality of third images;
   obtaining cultivated land images by segmenting each of the third images using a watershed segmentation algorithm;
   performing corrosion and expansion treatment on each of the cultivated land images;
   calculating a quantity of pixels in each of connected areas in the performed cultivated land images;
   determining connected areas which have a quantity of the pixels less than or equal to a preset quantity threshold as first areas, and connected areas which have a quantity of the pixels more than the preset quantity threshold as second areas;
   setting pixels in the first areas to 0 and pixels in the second areas to 1 to obtain a plurality of binarized images;
   converting each of the plurality of binarized images into a vector image and storing the vector image;
   wherein the method of converting the binarized image into a vector image comprises:
   determining a plurality of curves in the binarized image;
   acquiring target coordinates of a first point and a last point of each curve;
   connecting a straight line between the first point and the last point;
   calculating Euclidean distances between a plurality of points on the curve and the straight line;

selecting a maximum Euclidean distance from the Euclidean distances;
determining whether the maximum Euclidean distance is greater than or equal to a preset threshold;
when the maximum Euclidean distance is greater than or equal to the preset threshold, dividing the curve into two parts at a point corresponding to the maximum Euclidean distance;
iteratively performing above steps until all the curves are converted to straight lines;
generating a vector image according to the straight lines.

2. The cultivated land recognition method of claim 1, wherein the method of detecting edges of ground level entities in the standard image using an edge detection model to obtain a second image comprises:
inputting the standard image into a first edge detection model to detect, the first edge detection model comprising a plurality of convolutional layers;
acquiring feature map output by each convolutional layer of the plurality of convolutional layers;
up-sampling a size of each the feature map to a size of the standard image to obtain up-sampled images;
detecting each of the up-sampled images using a second edge detection model to obtain a probability that each pixel in the up-sampled image belongs to the edge; and
calculating an average probability of each pixel at the same position in all the up-sampled images; and
generating a second image according to the average probability of each pixel.

3. The cultivated land recognition method of claim 2, wherein the method of merging the first image and the corresponding second image to obtain a third image comprises:
acquiring candidate pixel points in the second image, wherein the candidate pixel points are pixel points having probabilities greater than or equal to a preset probability threshold;
acquiring target pixel points in the first image that have same positions as the candidate pixel points;
determining ridge areas corresponding to the target pixel points in the first image; and
obtaining the third image by displaying the ridge areas in a first display mode, and displaying other areas in a second display mode.

4. The cultivated land recognition method of claim 1, further comprising:
training the cultivated land recognition model comprising:
acquiring a plurality of positive sample images and a plurality of negative sample images, wherein each of the positive sample images is a cultivated land image, and each of the negative sample images is a non-cultivated land image;
inputting the plurality of positive sample images and the plurality of negative sample images into a deep convolutional network for training;
calculating a risk loss value of a risk loss function of the deep convolutional network;
determining whether the risk loss value matches a preset convergence condition;
when the risk loss value is determined to match the preset convergence condition, updating parameters of an initial network framework of the deep convolutional network according to the risk loss value; and
determining the initial network framework after updating the parameters as a trained cultivated land recognition model.

5. The cultivated land recognition method of claim 1, further comprising:
enhancing the satellite image of the Earth before segmenting the satellite image of the Earth into a plurality of standard images; or
enhancing each of plurality of standard images after segmenting the satellite image of the Earth into a plurality of standard images.

6. A computing device, comprising:
at least one processor; and
a storage device storing one or more programs which when executed by the at least one processor, causes the at least one processor to:
segment a satellite image of the Earth into a plurality of standard images;
recognize cultivated land area in each of the standard images using a cultivated land recognition model to obtain a plurality of first images;
detect edges of ground level entities in each of the standard images using an edge detection model to obtain a plurality of second images;
merge each of the first images and a corresponding one of the second images to obtain a plurality of third images;
obtain cultivated land images by segmenting each of the third images using a watershed segmentation algorithm;
perform corrosion and expansion treatment on each of the cultivated land images;
calculate a quantity of pixels in each of connected areas in the performed cultivated land images;
determine connected areas which have a quantity of the pixels less than or equal to a preset quantity threshold as first areas, and connected areas which have a quantity of the pixels more than the preset quantity threshold as second areas;
set pixels in the first areas to 0 and pixels in the second areas to 1 to obtain a plurality of binarized images;
convert each of the plurality of binarized images into a vector image and storing the vector image;
wherein the method of converting the binarized image into a vector image comprises:
determining a plurality of curves in the binarized image;
acquiring target coordinates of a first point and a last point of each curve;
connecting a straight line between the first point and the last point;
calculating Euclidean distances between a plurality of points on the curve and the straight line;
selecting a maximum Euclidean distance from the Euclidean distances;
determining whether the maximum Euclidean distance is greater than or equal to a preset threshold;
when the maximum Euclidean distance is greater than or equal to the preset threshold, dividing the curve into two parts at a point corresponding to the maximum Euclidean distance;
iteratively performing above steps until all the curves are converted to straight lines;
generating a vector image according to the straight lines.

7. The computing device of claim 6, wherein the method of detecting edges of ground level entities in the standard image using an edge detection model to obtain a second image comprises:
inputting the standard image into a first edge detection model to detect, the first edge detection model comprising a plurality of convolutional layers;

acquiring feature map output by each convolutional layer of the plurality of convolutional layers;

up-sampling a size of each the feature map to a size of the standard image to obtain up-sampled images;

detecting each of the up-sampled images using a second edge detection model to obtain a probability that each pixel in the up-sampled image belongs to the edge; and calculating an average probability of each pixel at the same position in all the up-sampled images; and generating a second image according to the average probability of each pixel.

8. The computing device of claim 6, wherein the method of merging the first image and the corresponding second image to obtain a third image comprises:

acquiring candidate pixel points in the second image, wherein the candidate pixel points are pixel points having probabilities greater than or equal to a preset probability threshold;

acquiring target pixel points in the first image that have same positions as the candidate pixel points;

determining ridge areas corresponding to the target pixel points in the first image; and obtaining the third image by displaying the ridge areas in a first display mode, and displaying other areas in a second display mode.

9. The computing device of claim 6, the at least one processor further to:

train the cultivated land recognition model comprising:

acquire a plurality of positive sample images and a plurality of negative sample images, wherein each of the positive sample images is a cultivated land image, and each of the negative sample images is a non-cultivated land image;

input the plurality of positive sample images and the plurality of negative sample images into a deep convolutional network for training;

calculate a risk loss value of a risk loss function of the deep convolutional network;

determine whether the risk loss value matches a preset convergence condition;

when the risk loss value is determined to match the preset convergence condition, update parameters of an initial network framework of the deep convolutional network according to the risk loss value; and determine the initial network framework after updating the parameters as a trained cultivated land recognition model.

10. The computing device of claim 6, the at least one processor further to:

enhance the satellite image of the Earth before segmenting the satellite image of the Earth into a plurality of standard images; or enhance each of plurality of standard images after segmenting the satellite image of the Earth into a plurality of standard images.

11. A non-transitory storage medium having stored thereon instructions that, when executed by a processor of a computing device, causes the computing device to perform a cultivated land recognition method in a satellite image, the method comprising:

segmenting a satellite image of the Earth into a plurality of standard images;

recognizing cultivated land area in each of the standard images using a cultivated land recognition model to obtain a plurality of first images;

detecting edges of ground level entities in each of the standard images using an edge detection model to obtain a plurality of second images;

merging each of the first images and a corresponding one of the second images to obtain a plurality of third images;

obtaining cultivated land images by segmenting each of the third images using a watershed segmentation algorithm;

performing corrosion and expansion treatment on each of the cultivated land images;

calculating a quantity of pixels in each of connected areas in the performed cultivated land images;

determining connected areas which have a quantity of the pixels less than or equal to a preset quantity threshold as first areas, and connected areas which have a quantity of the pixels more than the preset quantity threshold as second areas;

setting pixels in the first areas to 0 and pixels in the second areas to 1 to obtain a plurality of binarized images; and converting each of the plurality of binarized images into a vector image and storing the vector image;

wherein the method of converting the binarized image into a vector image comprises:

determining a plurality of curves in the binarized image;

acquiring target coordinates of a first point and a last point of each curve;

connecting a straight line between the first point and the last point calculating Euclidean distances between a plurality of points on the curve and the straight line;

selecting a maximum Euclidean distance from the Euclidean distances;

determining whether the maximum Euclidean distance is greater than or equal to a preset threshold;

when the maximum Euclidean distance is greater than or equal to the preset threshold, dividing the curve into two parts at a point corresponding to the maximum Euclidean distance;

iteratively performing above steps until all the curves are converted to straight lines;

generating a vector image according to the straight lines.

12. The non-transitory storage medium of claim 11, wherein the method of detecting edges of ground level entities in the standard image using an edge detection model to obtain a second image comprises:

inputting the standard image into a first edge detection model to detect, the first edge detection model comprising a plurality of convolutional layers;

acquiring feature map output by each convolutional layer of the plurality of convolutional layers;

up-sampling a size of each the feature map to a size of the standard image to obtain up-sampled images;

detecting each of the up-sampled images using a second edge detection model to obtain a probability that each pixel in the up-sampled image belongs to the edge;

calculating an average probability of each pixel at the same position in all the up-sampled images; and generating a second image according to the average probability of each pixel.

13. The non-transitory storage medium of claim 11, wherein the method of merging the first image and the corresponding second image to obtain a third image comprises:

acquiring candidate pixel points in the second image, wherein the candidate pixel points are pixel points having probabilities greater than or equal to a preset probability threshold;

acquiring target pixel points in the first image that have same positions as the candidate pixel points;

determining ridge areas corresponding to the target pixel points in the first image; and obtaining the third image by displaying the ridge areas in a first display mode, and displaying other areas in a second display mode.

14. The non-transitory storage medium of claim 11, further comprising:

training the cultivated land recognition model comprising:

acquiring a plurality of positive sample images and a plurality of negative sample images, wherein each of the positive sample images is a cultivated land image, and each of the negative sample images is a non-cultivated land image;

inputting the plurality of positive sample images and the plurality of negative sample images into a deep convolutional network for training;

calculating a risk loss value of a risk loss function of the deep convolutional network;

determining whether the risk loss value matches a preset convergence condition;

when the risk loss value is determined to match the preset convergence condition, updating parameters of an initial network framework of the deep convolutional network according to the risk loss value; and determining the initial network framework after updating the parameters as a trained cultivated land recognition model.

* * * * *